Patented Aug. 22, 1939

2,169,995

UNITED STATES PATENT OFFICE 2,169,995

LIQUID DIELECTRIC COMPOSITIONS

Gerald H. Coleman and Luther F. Berhenke, Midland, Mich., assignors to The Dow Chemical Company, Midland, Mich., a corporation of Michigan No Drawing. Application February 24, 1938, Serial No. 192,392

10 Claims. (Cl. 252—1)

This invention concerns certain new liquid dielectric compositions comprising halogenated diphenyl oxide and alkylated diphenyl oxide. Such compositions are valuable as insulating and/or cooling liquids in electric devices such as transformers, capacitors, switches, cable joints, and the like, and as impregnating agents for condensers, insulating wrappings, etc.

In the following specification and claims, the term "alkylated diphenyl oxide" refers to diphenyl oxide substituted in either or both of the benzene nuclei by one or more alkyl groups. Also, the terms "mono-alkylated diphenyl oxide", "dialkylated diphenyl oxide", etc., refer to alkylated diphenyl oxides having an average alkyl content corresponding to one or two alkyl groups respectively per molecule of alkylated diphenyl oxide. The alkylated diphenyl oxides need not be individual compounds, but instead are usually mixtures of isomeric and homologous compounds obtained by reacting an olefin or alkyl halide with diphenyl oxide in the presence of aluminum chloride or other catalyst. Similarly, the terms "pentahalogenated diphenyl oxide" and "hexahalogenated diphenyl oxide" refer to halogenated diphenyl oxides having a halogen content corresponding to five and six halogen atoms respectively per molecule of halogenated diphenyl oxide.

Halogenated diphenyl oxides, e. g. pentabrominated diphenyl oxide, hexachlorinated diphenyl oxide, etc., have certain properties which render them valuable as dielectric mediums, as for example, their high electrical resistance and dielectric strength, their low power factor, and their non-flammable and substantially non-corrosive nature. However, the halogenated diphenyl oxides which have the most desirable electrical properties, e. g. the halogenated diphenyl oxides containing four or more halogen atoms per halogenated diphenyl oxide molecule, have high viscosities at ordinary temperatures and this latter characteristic greatly restricts their field of use. Pentachlorinated diphenyl oxide, for example, has excellent dielectric properties, having a dielectric constant of about 5, a D. C. resistance of about $1 \times 10^{12}$ ohms/cm.$^3$ at 100° C., and a power factor of about 0.5 per cent at 25° C., but it possesses the undesirable property of being a thick, viscous liquid with an absolute viscosity of about 450 centipoises at 25° C., and a pour point of about 0° C. Liquids of such high viscosity are not only difficult to handle but they also often contain occluded air which cannot readily be removed and which greatly reduce the dielectric strength of the liquid. For example, hexachlorinated diphenyl oxide which has been carefully treated in a vacuum to remove air bubbles has an average breakdown potential of approximately 30,000 volts across a 0.1" gap at 60 cycles, whereas the untreated material has an average breakdown potential of only 16,500 volts under these conditions.

We have now found that the liquid alkylated diphenyl oxides which contain not more than four alkyl groups per molecule of alkylated diphenyl oxide may be blended with the halogenated diphenyl oxides to produce liquid compositions of low viscosity which retain the desirable dielectric properties of the halogenated diphenyl oxides. Thus, a composition consisting of equal parts of mono-ethylated dipheny oxide, i. e. an ethylated diphenyl oxide in which the ethyl group is present in an amount corresponding to one ethyl group per molecule of ethylated diphenyl oxide, and hexachlorinated diphenyl oxide is a relatively mobile liquid, having a viscosity of less than 60 centipoises at 20° C. and a pour point below minus 25° C., and having substantially the same dielectric properties as hexachlorinated diphenyl oxide itself. Such liquid mixtures of alkylated and halogenated diphenyl oxides are substantially non-corrosive towards metals, are not readily decomposed by light or heat, and do not tend to sludge or deteriorate upon standing. Moreover, they are much less flammable than the hydrocarbon mineral oils commonly employed as dielectric fluids, and they do not evolve highly flammable gases under arc decomposition.

The viscosity of a mixture of alkylated and halogenated diphenyl oxides may be varied between wide limits by adjusting the proportions in which the ingredients are employed. In general, the viscosity of the mixture increases as the proportion of alkylated diphenyl oxide is decreased. The most satisfactory viscosity characteristics are dependent upon the manner in which the composition is to be employed. Thus, a composition which is to be used as an impregnating agent for condensers or as a quenching liquid in switches should have a lower viscosity than a composition which is to be used as a transformer fluid. Ordinarily, mixtures having viscosities between 10 and 200 centipoises at 40° C. will be found to be most satisfactory for general use.

The exact proportions of ingredients used in preparing a composition of given viscosity depend upon the particular alkylated and halogenated diphenyl oxides employed. Ordinarily, we prefer to employ approximately 0.1 to 10.0 parts by weight of a lower alkylated diphenyl oxide, e. g. mono-ethylated diphenyl oxide, mono-butylated diphenyl oxide, etc., per part of halogenated diphenyl oxide, although the more highly alkylated diphenyl oxides, e. g. tri-isopropylated diphenyl oxide, tetra-ethylated diphenyl oxide, etc., may be employed if desired. When employing such higher alkylated products, however, it may be necessary to increase the proportion of the same, since the higher alkylated diphenyl oxides are usually somewhat more viscous than the lower alkylated products. Any of the halogenated diphenyl oxides, containing four or more halogen atoms per molecule of halogenated diphenyl oxide, e. g. tetra-brominated diphenyl oxide, pentachlorinated diphenyl oxide, hexachlorinated diphenyl oxide, heptabrominated diphenyl oxide, octachlorinated diphenyl oxide, etc., may be employed in preparing dielectric compositions according to the invention, but we usually prefer to use penta- or hexachlorinated diphenyl oxide because of their somewhat superior dielectric properties.

The following table shows certain physical and electrical properties of a number of the new dielectric compositions. In each case hexachlorinated diphenyl oxide was mixed with the alkylated diphenyl oxide in the proportions given, and the properties of the mixture determined under the conditions indicated. Data on hexachlorinated diphenyl oxide alone are also included for purpose of comparison.

| Alkylated DPO | Alkylated DPO percent by weight | Hexachlorinated DPO percent by weight | Absolute viscosity in centipoises | | Specific gravity 20/40° C. | Dielectric constant 1,000 cycles | Percent power factor, 1,000 cycles | Dielectric strength volts across 0.1″ gap 60 cycles |
|---|---|---|---|---|---|---|---|---|
| | | | 20° C. | 60° C. | | | | |
| Ethylated DPO | 88 | 12 | 11.51 | 3.41 | 1.082 | 3.47 | 0.18 | 30,000 |
| Do | 50 | 50 | 56.42 | 7.72 | 1.280 | 3.72 | 0.14 | 30,000 |
| Do | 10 | 90 | 70.8 | 55.8 | 1.541 | 4.08 | 0.02 | 30,000 |
| Amylated DPO | 90 | 10 | 26.52 | 4.88 | 1.001 | 3.14 | 0.02 | 30,000 |
| Do | 50 | 50 | 118 | 10.57 | 1.228 | 3.56 | 0.03 | 30,000 |
| Do | 10 | 90 | 1230 | 71.89 | 1.537 | 4.13 | 0.14 | 30,000 |
| Sec.-butylated DPO | 50 | 50 | 160 | 12.02 | 1.239 | 3.51 | 0.02 | 30,000 |
| Do | 0 | 100 | 8200 | 96.0 | 1.634 | 4.25 | 1.50 | 16,500 |

The invention is not limited to compositions comprising a single alkylated diphenyl oxide and a single halogenated diphenyl oxide. If desired, mixtures of such products may be employed in preparing the new dielectric compositions. For example, a mixture of mono- and di-ethylated diphenyl oxides may be blended with hexachlorinated diphenyl oxide or a mixture of penta- and hexachlorinated diphenyl oxides to produce low viscosity compositions which have excellent dielectric properties. Other compositions suitable for use as dielectric fluids may be prepared by mixing mono-isopropylated and pentachlorinated diphenyl oxide; mono-ethylated diphenyl oxide and a mixture of tetra- and pentachlorinated diphenyl oxide; a mixture of mono- and di-butylated diphenyl oxides and tetrabrominated diphenyl oxide; mono-ethylated diphenyl oxide and heptachlorinated diphenyl oxide; a mixture of tertiary-butylated diphenyl oxides and hexabrominated diphenyl oxide; etc.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. A liquid dielectric composition consisting of halogenated diphenyl oxide having a halogen content corresponding to at least 4 atoms of combined halogen per molecule, and a substantial proportion of alkylated diphenyl oxide having an average of not more than 4 alkyl groups per molecule.

2. A liquid dielectric composition consisting of chlorinated diphenyl oxide having a chlorine content corresponding to at least 4 atoms of combined chlorine per molecule, and a substantial proportion of alkylated diphenyl oxide having an average of not more than 4 alkyl groups per molecule.

3. A liquid dielectric composition consisting of chlorinated diphenyl oxide having a chlorine content corresponding to between about 5 and about 6 atoms of combined chlorine per molecule, and a substantial proportion of an alkylated diphenyl oxide having an average of not more than 4 alkyl groups per molecule.

4. A liquid dielectric composition comprising between about 10 and about 90 per cent by weight of halogenated diphenyl oxide having a halogen content corresponding to at least 4 atoms of combined halogen per molecule, and between about 90 and about 10 per cent by weight of alkylated diphenyl oxide having an average of not more than 4 alkyl groups per molecule.

5. A liquid dielectric composition comprising between about 10 and about 90 per cent by weight of chlorinated diphenyl oxide having a chlorine content corresponding to at least 4 atoms of combined chlorine per molecule, and between about 90 and about 10 per cent by weight of alkylated diphenyl oxide having an average of not more than 4 alkyl groups per molecule.

6. A liquid dielectric composition comprising between about 10 and about 90 per cent by weight of a chlorinated diphenyl oxide having a chlorine content corresponding to between about 5 and about 6 chlorine atoms per molecule, and between about 90 and about 10 per cent by weight of alkylated diphenyl oxide having an average of not more than 4 alkyl groups per molecule.

7. A liquid dielectric composition consisting of hexachlorinated diphenyl oxide and ethylated diphenyl oxide having an ethyl group content corresponding to not more than 4 ethyl groups per molecule.

8. A liquid dielectric composition consisting of hexachlorinated diphenyl oxide and sec.-butylated diphenyl oxide having a sec.-butyl group content corresponding to not more than 4 sec.-butyl groups per molecule.

9. A liquid dielectric composition consisting of hexachlorinated diphenyl oxide and amylated diphenyl oxide having an amyl group content corresponding to not more than 4 amyl groups per molecule.

10. A liquid dielectric composition consisting of halogenated diphenyl oxide having a halogen content corresponding to at least 4 atoms of combined halogen per molecule and alkylated diphenyl oxide, said composition having a viscosity less than that of the halogenated diphenyl oxide alone.

GERALD H. COLEMAN.
LUTHER F. BERHENKE.